United States Patent [19]
Aarts

[11] 3,799,280
[45] Mar. 26, 1974

[54] AUTOMATIC WEIGHING APPARATUS INCLUDING CONVEYOR MEANS

[75] Inventor: Matias L. C. Aarts, Vught, Netherlands

[73] Assignee: Mettler Instrumente AG, Zurich, Switzerland

[22] Filed: Jan. 9, 1973

[21] Appl. No.: 322,202

[30] Foreign Application Priority Data
Jan. 14, 1972 Netherlands.................... 7200598

[52] U.S. Cl...................... 177/53, 177/52, 177/56, 177/80, 177/120, 177/121, 177/122, 177/152, 177/165
[51] Int. Cl............................................. G01g 13/00
[58] Field of Search.......... 177/52, 53, 60, 114, 115, 177/116–122, 125, 145, 154–156, 164, 165, 210, DIG. 1, 6, 11

[56] References Cited
UNITED STATES PATENTS

| | | | |
|---|---|---|---|
| 3,613,808 | 10/1971 | Bunnelle............................. | 177/53 |
| 3,696,584 | 10/1972 | Rickard......................... | 177/120 X |
| 3,519,093 | 7/1970 | Ramsai........................... | 177/210 X |
| 3,436,968 | 4/1963 | Unger et al........................ | 177/52 |
| 3,152,655 | 10/1964 | Allen et al............................ | 177/52 |
| 2,858,124 | 10/1958 | Allen et al......................... | 177/154 |

Primary Examiner—Richard B. Wilkinson
Assistant Examiner—Vit W. Miska
Attorney, Agent, or Firm—Lawrence E. Laubscher

[57] ABSTRACT

Automatic weighing apparatus including weighing means, a weighing pan movable between loading and weighing positions remote from and in operative engagement with said weighing means, respectively, and conveyor means for supplying articles to said weighing pan when in the loading position. The conveyor means includes a preliminary vibratory channel portion and an intermediate vibratory portion. First article sensing means are provided for automatically displacing the weighing pan from the loading position to the weighing position upon the supply of an article to the weighing pan, and for simultaneously interrupting operation of said intermediate vibratory conveyor portion. Second article sensing means are operable upon the discharge of an article from the preliminary vibratory channel means for successively reducing the conveying speed of said vibratory channel means between high-speed, low-speed and completely de-activated operating conditions, respectively.

6 Claims, 5 Drawing Figures

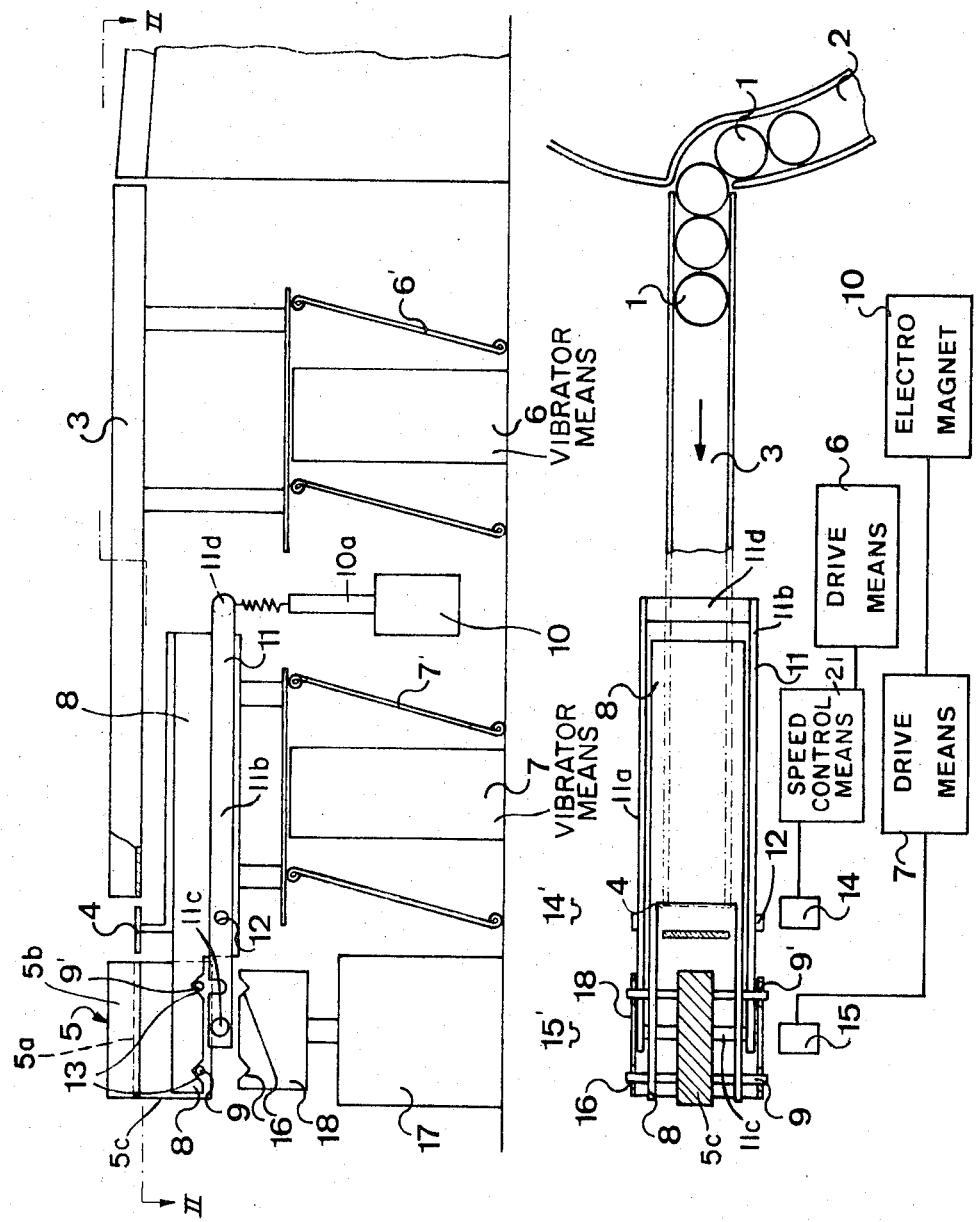

AUTOMATIC WEIGHING APPARATUS INCLUDING CONVEYOR MEANS

This invention relates generally to automatic weighing apparatus including a conveyor system. Such a weighing apparatus has utility in weighing in quick succession identical or similar elements, for example tablets, capsules, nuts and screws, or bulk goods such as grain.

For carrying out series weighing operations of this kind, it is desirable to integrate the weighing machine as far as possible into the conveyor system, in order to save time. It is also desirable, however for the weighing means, which is generally highly sensitive, to be kept free of loadings when the actual weighing process is not taking place. Furthermore, in the case of weighing machines which are integrated into the conveyor system, dynamic weighing errors can occur owing to the movement of the articles to be weighed.

It has been proposed (as evidenced, for example, by the U. S. Pat. to Bunnelle No. 3,613,808) that the weighing pan be arrested during the weighing operation. This arrangement, however, does not prevent the weighing machine from being virtually continuously subjected to load.

According to a primary object of the present invention, an improved automatic weighing apparatus is provided comprising a weighing means, a conveyor system for conveying to the weighing means an element to be weighed, and a weighing pan for receiving a said element, the weighing pan forming a part of the conveyor system and being so arranged that whenever an element to be weighed arrives on the weighing pan, the weighing pan is temporarily disconnected from the conveyor system and is operatively connected with the weighing means.

According to a more specific object of the invention, the conveyor means includes a preliminary vibratory channel portion and an intermediate vibratory portion. First sensing means are operable when an article is supplied from said intermediate vibratory portion to said weighing pan for completely de-activating said intermediate vibratory portion and for transporting the weighing pan from the loading position relative to the conveyor means to a weighing position in operative weighing engagement with the weighing means. Second sensing means are operable when an article is discharged from said preliminary vibratory channel onto said intermediate portion for automatically reducing the conveying speed of said preliminary vibratory channel between successive high-speed, low-speed and completely de-activated operating conditions. The speed control means includes phase-responsive control means the operating conditions of which are automatically varied by photocell means arranged adjacent the discharge end of the vibratory channel means.

Other objects and advantages of the invention will now become apparent when viewed in the light of the accompanying drawing, in which:

FIG. 1 is a side elevation view of the automatic weighing apparatus of the present invention;

FIG. 2 is a sectional view taken along line 1—1 of FIG. 1;

Figure 3:
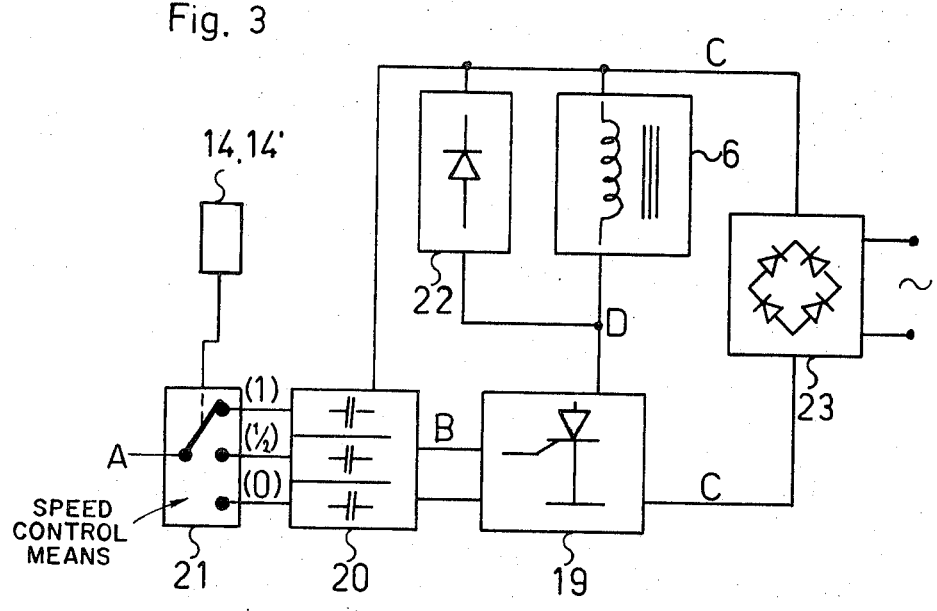
FIG. 3 is an electrical block diagram of the phase-dependent control means for the conveyor drive means.

Referring first more particularly to FIG. 1 and 2, elements 1 to be weighed are delivered in succession from a channel filling means 2 into vibratory channel means 3 and thereupon are advanced in succession to the discharge end of the channel 3, from which they pass by way of an intermediate member 4 onto a weighing pan 5. In the position of the machine as shown in FIG. 1, the channel means 3 and the intermediate member 4 and the weighing pan 5 are actuated in a vibratory manner for conveying the elements 1 by conventional drive means 6, 6' and 7 7', respectively.

The drive means 6 and 6' drive the channel 3 directly, whereas the drive means 7 and 7' act on a holder 8 to which the intermediate member 4 is directly connected. The weighing pan 5 which has an upper portion including bottom wall 5a and a pair of side walls 5b, is indirectly connected to the holder 8 by means of transverse pins 9 and 9' which are secured to the weighing pan 5 and which are pressed into downwardly open notches 13 in the holder 8 by a lever means 11 which is pivotally supported by pivot 12, the lever means 11 being controlled by an electromagnet 10. As shown in FIG. 2, the lever means 11 comprises a pair of parallel side plates 11a, 11b the ends of which are connected by transverse rods 11c, 11d. The transverse rod 11c extends under the lower vertical base portion 5c of the weighing pan.

The arrival of an element 1 at the discharge end of the channel 3 is detected by a first photoelectric cell assembly 14 and 14', whereupon the conveyor speed of the channel means 3 is reduced from a relatively high-speed initial value to a relatively low-speed intermediate value by conventional phase-responsive means which control the operation of drive means 6, as will be described below. When the element 1 has left the channel 3 and has arrived on the intermediate member 4, the drive means 6 and 6' for the channel 3 is completely de-activated. The intermediate member 4, together with the weighing pan 5, is still vibrating at full strength under the action of the drive means 7 and 7'. The vibration of the intermediate member 4 and the weighing pan 5 is stopped when the presence of the element 1 on the weighing pan 5 is detected by a second photoelectric cell assembly 15 and 15'.

Following the de-activation of the weighing pan vibration drive means 7 and 7', the electromagnet 10 is de-activated to release armature 10a, thereby to permit lever 11 to pivot in the counter-clockwise direction in FIG. 1, so that the weighing pan 5 moves downwardly in FIG. 1, the pins 9 and 9' being disengaged from the notches 13 and falling into the upwardly directed notches 16 in a bridge member 18 connected to conventional weighing means 17. The weighing pan 5 is now exclusively connected with the weighing device 17, whereupon the weighing of the element 1 on the weighing pan 5 is now effected.

After conclusion of the weighing operation of the element on the weighing pan 5, the electromagnet 10 is de-activated and the lever 11 is pivoted in a clockwise direction in FIG. 1, whereby the weighing pan 5 is raised so that its pins 9 and 9' are pressed back into the notches 13, the drive means 6, 6' and 7, 7' then being set in operation again. The weighed element 1 is dispensed from the weighing pan and a following element 1 is moved thereon. At this stage the weighing pan 5 is again completely disconnected from the weighing device 17.

Figure 4:
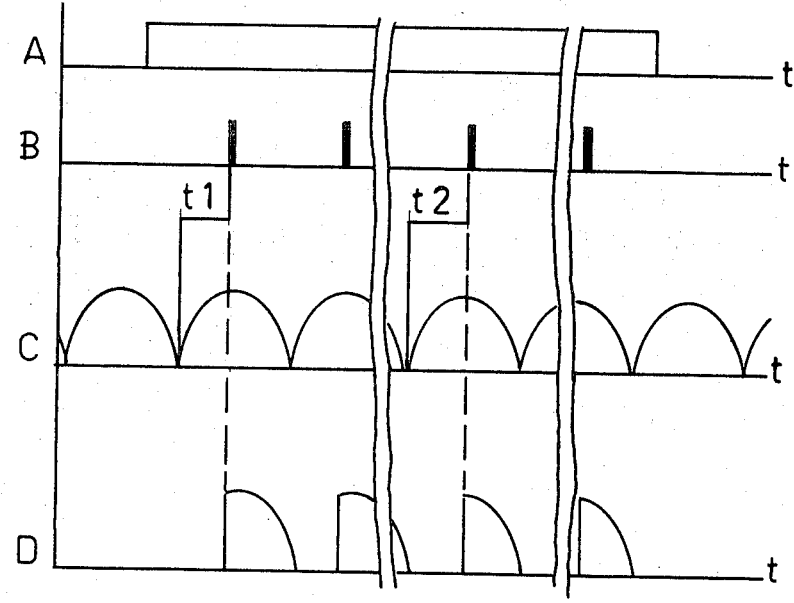
FIG. 4 is a waveform diagram illustrating the electrical operation of the conveyor control means of FIG. 3.
Figure 5:
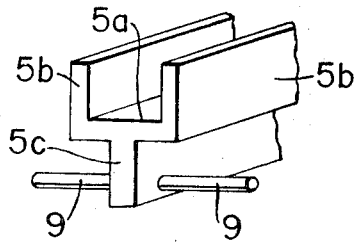
FIG. 5 is a detailed perspective view of the weighing pan.

The aforementioned phase-responsive means for controlling the operation of the vibratory channel means 3 between relatively high-speed, relatively low-speed, and completely de-activated operating conditions will now be described. Referring to FIGS. 3 and 4, the drive means 6 includes an electromagnetic solenoid 6 that is connected in series with the power circuit electrodes of a thyristor 19 and with the output terminals of full wave rectifier means 23 the input terminals of which are connected with a source of alternating current voltage (having a frequency, for example, of 50 Hz). The control electrode of the thyristor is energized via delay means 20 having three operating conditions as controlled by the conventional speed control means 21.

When drive means 6 is activated, start pulse A is applied to speed control means 21 to cause the shortest timing condition [(1) in FIG. 3] to be effected in delay means 20, whereupon after the time period ($t_1$), thyristor 19 will be rendered alternately conductive and non-conductive at a relatively high rate to establish the initial high speed conveying operation of vibratory channel means 3. This is repeated for each half-cycle of the alternating current supply voltage until photocell means 14 detects the discharge of an article 1 from the vibratory channel means 3, whereupon the speed control means 21 is operated to effect the second delay condition [(one-half) in FIG. 3] in the delay means 20. The delay period $t_2$ is now established which causes thyristor 19 to be non-conductive for longer periods of time, whereupon the voltage D feeding the drive actuating means 6 reduces the conveyor speed to a given low-speed value (for example, one-half of the high speed value).

When the element 1 has again moved out of the region of the photoelectric cell assembly 14 and 14', a fresh signal to the speed control means 21 effects a third timing condition in the delay means 20 [Reference (0) in FIG. 3]. This is infinite, that is to say, the thyristor 19 no longer receives voltage and the drive means actuating part 6 is de-activated after the half cycle just begins to reach the zero line. A diode circuit 22 arranged parallel to the drive means provides for rapid electrical damping.

The above described arrangement for the phase-dependent control of the drive means is one of numerous possibilities. One advantage lies in the fact that it operates without substantial power loss. The above arrangement provides a control in dependence on the alternation of the supply voltage reaching the zero line. The passage through zero is a moment in time which is particularly easy to ascertain; however, any other phase point can be used as the determining criterion. It is important that de-activation should always occur at the same moment with respect to the phase pattern, in order for the conveyor means to be of a reproduceable performance as regards its coming to a stop.

The above-described automatic weighing machine can be used to weigh for example from 3,000 to 5,000 pills per hour.

While in accordance with the provisions of the Patent Statutes the preferred form and embodiments have been illustrated and described, it will be apparent to those skilled in the art that various changes and modifications may be made without deviating from the inventive concepts.

What is claimed is:

1. Automatic weighing apparatus, comprising
   a. weighing means (17) for weighing articles;
   b. a weighing pan (5);
   c. first conveyor means for conveying articles to said weighing pan when said pan is in an article loading position remote from said weighing means, said first conveyor means including
      1. a generally horizontal intermediate member (4); and
      2. first vibrating means (7) for vibrating said horizontal member to effect transport of articles thereacross;
   d. means (10, 11) for displacing said weighing pan between said loading position and a weighing position in operative weighing engagement with said weighing means, said displacing means maintaining said weighing pan, when in the loading position, in common vibratory engagement with said first conveyor means, whereby when said pan is in the loading position, an article discharged by vibration from said first conveyor means is received by and is transported by vibration across said pan; and
   e. first article sensing means (15, 15') operable when said article is transported to a given position on said pan for deactivating said vibrating means and for operating said pan displacing means to transport said pan from said article loading position to said article weighing position.

2. Apparatus as defined in claim 1, and further including
   f. second conveyor means for transporting articles to said first conveyor means, said second conveyor means including
      1. a generally horizontal channel (3); and
      2. second vibrating means (6) for vibrating said channel at a relatively high rate of vibration;
   g. second sensing means (14, 14') for detecting the discharge of an article from said channel; and
   h. speed control means (21) operable by said second sensing means for initially reducing the speed of operation of said vibratory channel means to a relatively low rate of vibration, and for subsequently de-activating said vibratory channel to an off condition.

3. Apparatus as defined in claim 1, wherein said weighing means includes a bridge support member (18); wherein said first conveying means includes a holder member (8) connected for vibration with said intermediate member, said weighing pan in said loading and weighing positions being in engagement with said holder member and with said bridge support member, respectively; and further wherein said weighing pan displacing means includes a pivotal lever (11) for displacing said weighing pan between said first and second positions.

4. Apparatus as defined in claim 3, wherein said weighing pan includes a plurality of parallel pins (9) extending laterally from opposite sides thereof, said holder member containing a plurality of downwardly directed recesses (13) for receiving said pins when said weighing pan is in the loading position, and said bridge support member having a plurality of upwardly facing recesses (16) for receiving said pins when said weighing pan is in the weighing position.

5. Apparatus as defined in claim 3, wherein said weighing pan displacing means includes solenoid means (10) for operating said lever.

6. Apparatus as defined in claim 2, wherein said speed control means comprises
  1. a thyristor (19) having a pair of power circuit electrodes and a control electrode;
  2. a source of rectified alternating-current voltage (23);
  3. means connecting said power circuit electrodes and said voltage source in series with said second vibrating means; and
  4. means for supplying operating pulses to said control electrode to render conductive said thyristor, said pulse supplying means including
     a. a pulse source (A);
     b. a plurality of successively operable delay means (20) having different delay characteristics, respectively, the output terminals of said delay means being connected with said control electrode; and
     c. means (21) operable by said second sensing means to successively connect said pulse source to that delay means which establishes the shortest timing condition and a relatively high vibratory speed of said second vibrating means, to subsequently connect said pulse source to that delay means which establishes an intermediate timing condition and a lower vibratory speed, and to finally connect said pulse source to that delay means which de-activates said second vibrating means.

\* \* \* \* \*